(Model.) 4 Sheets—Sheet 1.
T. E. JEFFERSON.
HARROW.
No. 243,705. Patented July 5, 1881.
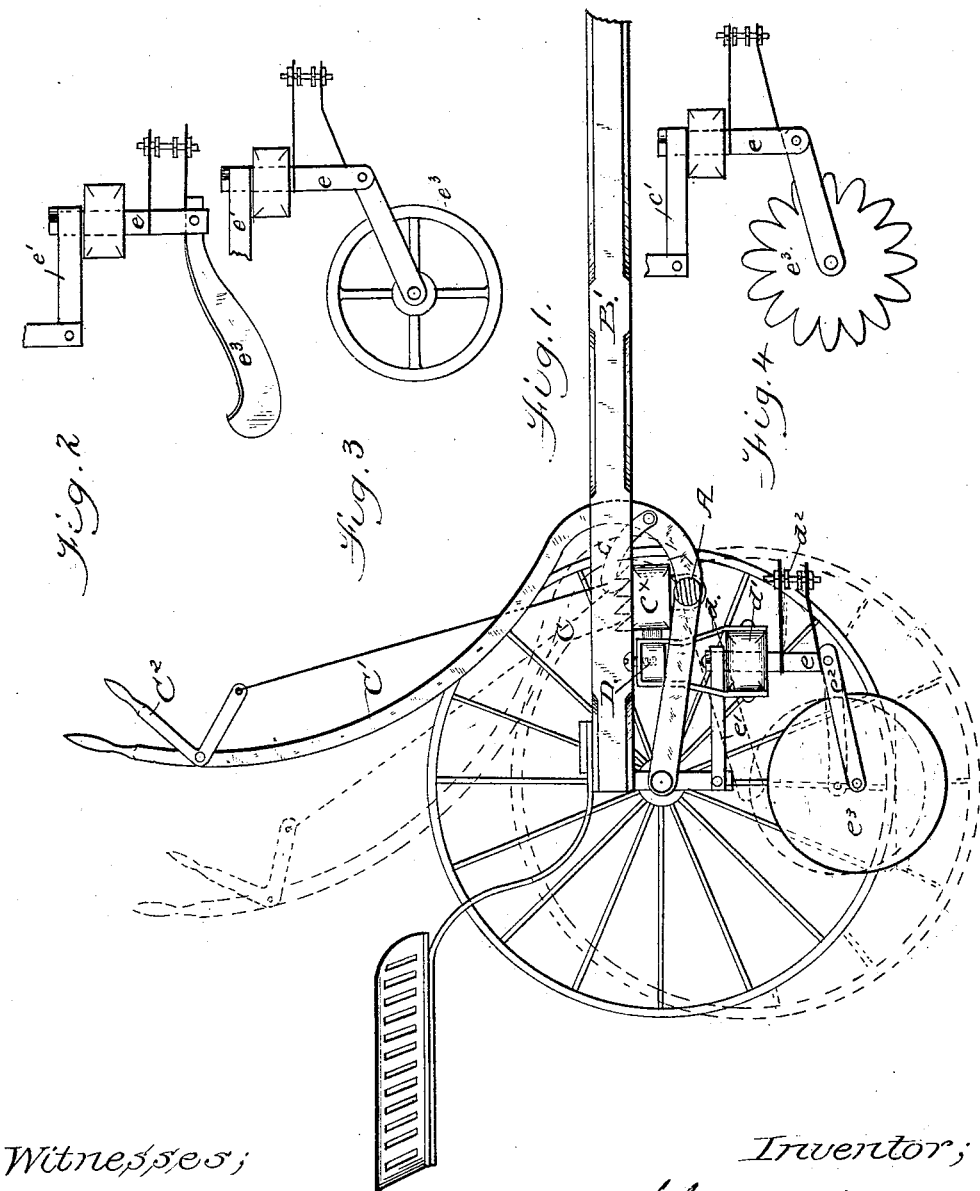
Witnesses;
H. Walter Fowler
Inventor;
Thos. E. Jefferson.
N. PETERS. Photo-Lithographer, Washington, D. C.

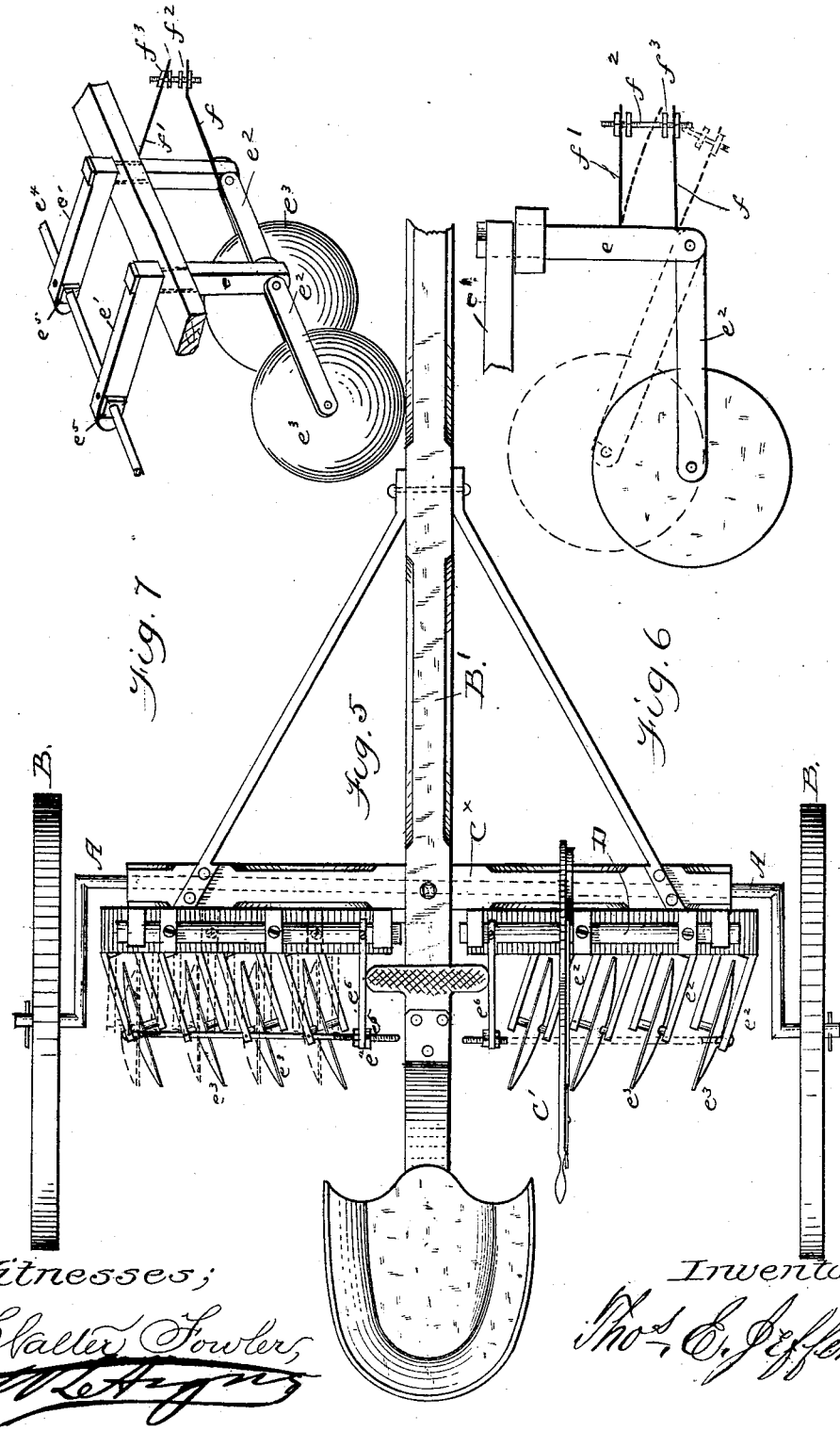

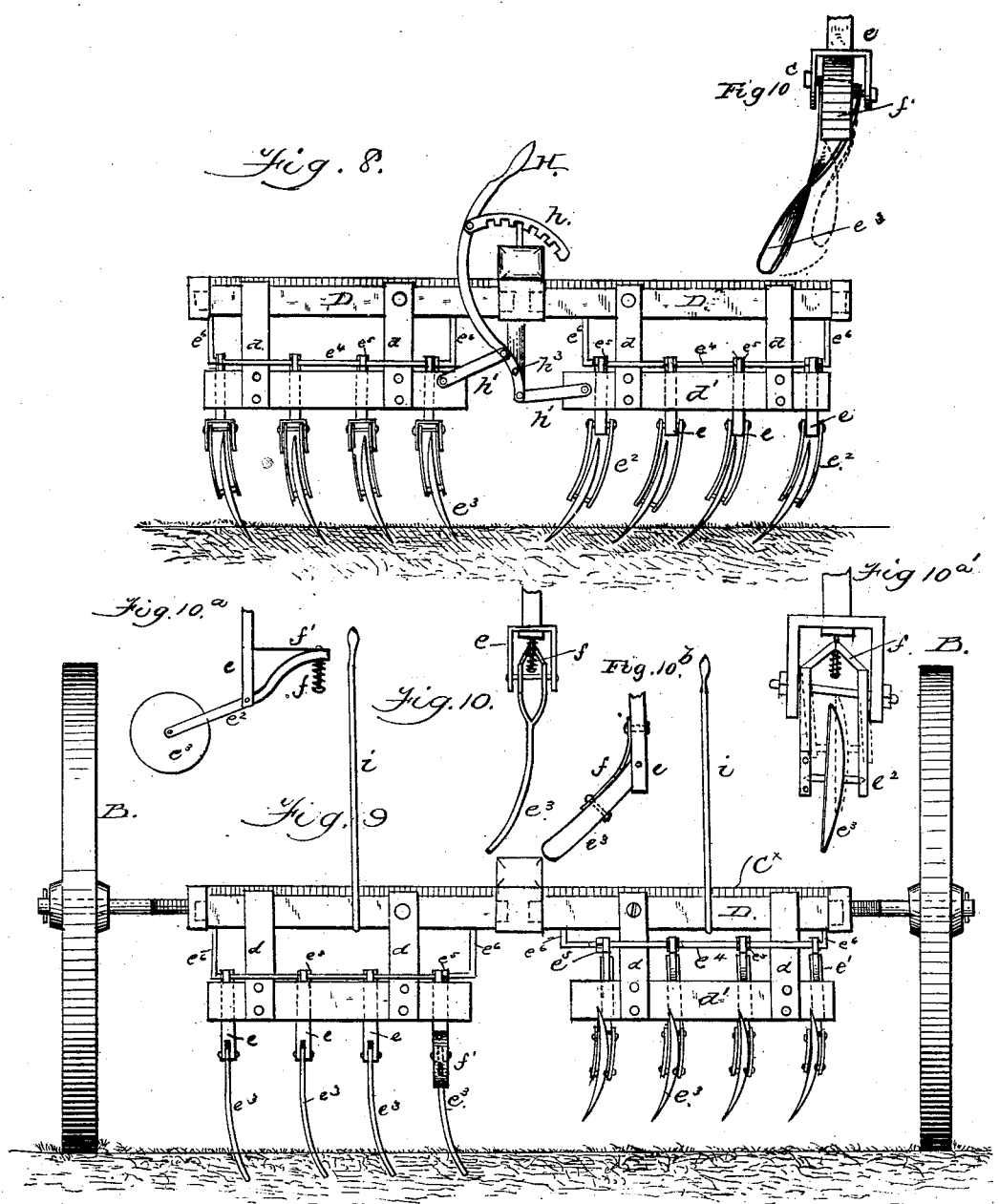

(Model.) 4 Sheets—Sheet 4.
T. E. JEFFERSON.
HARROW.
No. 243,705. Patented July 5, 1881.
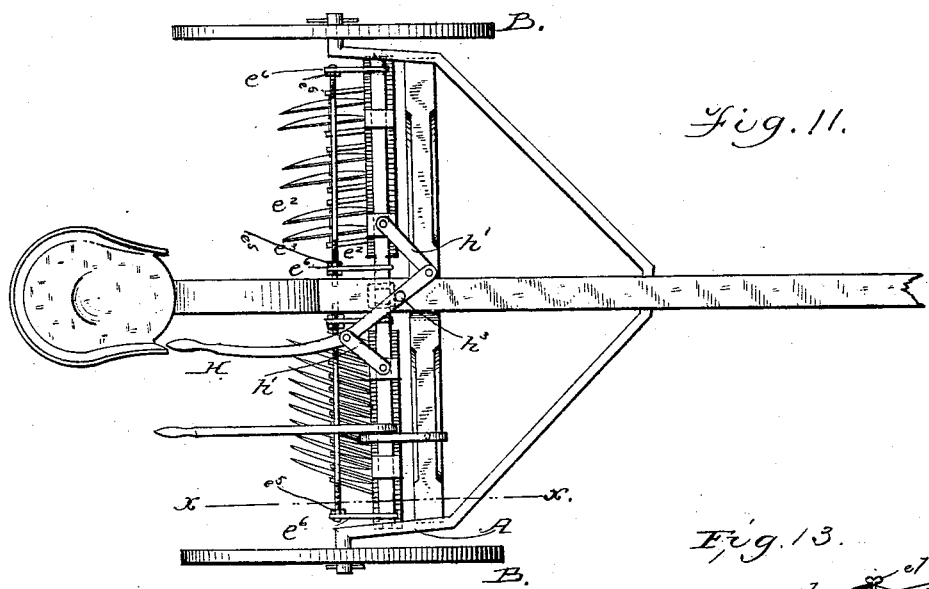
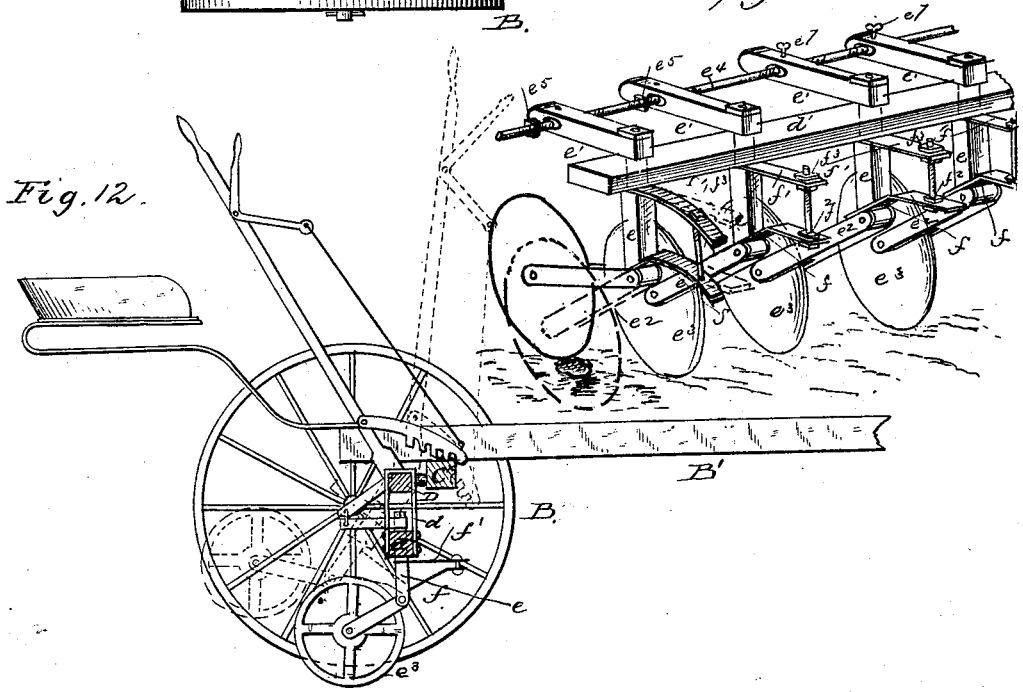
Witnesses:
Walter Fowler
Inventor:
Thos. E. Jefferson

UNITED STATES PATENT OFFICE.

THOMAS E. JEFFERSON, OF BOSTON, MASSACHUSETTS.

HARROW.

SPECIFICATION forming part of Letters Patent No. 243,705, dated July 5, 1881.

Application filed April 26, 1881. (Model.)

*To all whom it may concern:*

Be it known that I, THOMAS E. JEFFERSON, a citizen of the United States, residing at Boston, in the county of Suffolk and State of Massachusetts, have invented certain new and useful Improvements in Harrows; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to a harrow or cultivator for agricultural purposes having revolving disks or pivoted teeth hung upon a riding carriage or sulky, or operated independently of such device, the said teeth or disks being held in contact with the surface of the soil by the constant force of a spring, or its equivalent, or by gravity, in gangs or independently, and being susceptible of elevation independently or in sections or gangs, the novelty consisting in the construction and arrangement of parts, as will be more fully hereinafter set forth, and specifically pointed out in the claims.

The object of the invention is to provide a harrow or cultivator capable of effective service with or without riding-wheels, having revolving harrowing disks or teeth arranged in gangs or independently, and adapted to be adjusted laterally at will and to be regulated at any desired incline in relation to the line of travel to ride over obstructions and return to effective service upon the soil-surface independently by spring-action, or to be elevated in gangs or separately by the driver or operator, as shown in the drawings, and hereinafter to be described.

To enable others skilled in the art to which the invention relates to make and use my invention, I will describe the construction and operation of the same, reference being had to the accompanying drawings, which form a part of this specification, and in which—

Figure 1 is a side elevation of a sulky harrow or cultivator with revolving disks held in contact with the soil by the constant force of a spring, and susceptible of being elevated at will; Fig. 2, a detail view of a knife or tooth with compound spring and adjusting means for taking up the slack of the spring or compensating for loss of force therein; Fig. 3, a revolving harrowing or cultivating disk, with approximately similar compensating means; Fig. 4, a toothed revolving disk and compensating means, with compound springs; Fig. 5, a top-plan view, showing the lateral adjusting means, and in dotted lines the change of incline of the disks or teeth; Fig. 6, a side elevation, showing, in dotted lines, an independent disk in the act of riding over an obstacle or obstruction; Fig. 7, a perspective view, showing two disks, a compound spring, and means for hanging the disks adjustably; Fig. 8, a rear view, showing the lever connection, by which the lateral adjustment is made, and a toothed segment for locking the parts of the harrow or cultivator in any desired position; Fig. 9, a rear view, with gangs of disks or teeth operated independently by separate levers. Figs. $10^a$ $10^{a\prime}$ are detail views of disks, their springs, and connections; Figs. 10, $10^b$, and $10^c$, detail views of teeth and springs; Fig. 11, a top-plan view, showing the lateral adjusting means and means for elevating the teeth or disks; and Fig. 12, the spring-disk elevated upward and backward. Fig. 13 is a perspective view, showing the independent disks and springs, one of said disks being in the act of passing over an obstruction and the rest in service.

In the construction shown in Fig. $10^{a\prime}$ the diagonal pivotal axis in the frame $e^2$ or bolt allows the disk to avoid obstructions by a lateral oscillatory movement, hence may require less vertical elevation.

Referring to the drawings, in which similar letters of reference indicate like parts in all the figures, A, referring to Fig. 1, represents a crank-axle, upon which are journaled the riding-wheels B and the horizontal longitudinal frame B'.

Upon a main bar, $C^x$, or in other convenient position, is located a rack or ratchet, C, in the teeth of which operates a pawl, $c$, loosely pivoted to a hand-lever, C', within easy reach of the driver, and having pawl-tripping connection or trigger $C^2$, as shown. By means of this lever C' the crank-axle may be turned and the riding-wheels B forced down, which operation raises the entire harrowing mechanism, which will be hereinafter described, out of contact with the soil, in transportation from one field to another. By this means also the harrowing or cultivating devices may be forced into the soil, even to the extent of having the entire gravity of the machine rest upon said devices, and the wheels be raised so as to pass obstructions without disturbing the effective operation of the harrow.

D represents a bar in Fig. 1, to which is hung by a loop or bracket, $d$, a beam, $d'$, in which is loosely pivoted, at $d^2$, a standard, $e$, having an approximately horizontal arm, $e'$, above, and bifurcated arms $e^2$ below, in which is journaled the revolving harrows $e^3$ or their equivalents.

A rod, $e^4$, hung in arms $e^6$, and a set-nut, $e^5$, allows the proper pitch or angle to be given to the parts $e^3$ before the work is commenced, and this adjustment may be varied at will to suit different soils and necessities; but generally the proper relative pitch or adjustment of the harrow-disks need be changed but seldom. This adjustability is clearly shown in Fig. 5, and the construction of the pivotal harrow-disks shown in Fig. 7.

The disks $e^3$ may be hung independently, as shown in Figs. 6 and 7, and are allowed vertical play by means of a spring or springs, as shown. To this end a plate-spring, $f$, may be secured to the disk-frame and be connected to a spring, $f'$, by a bolt, $f^2$, and set-nuts $f^3$, as seen in Figs. 6 and 7, and also in Fig. 12; but it must be observed that this construction may be modified without departing from the principle of my invention in this part thereof, the essential feature of which is revolving harrow-disks held in contact with the soil for the purpose described, with the constant force of a spring or its equivalent, either independently or in gangs, and allowed to surmount obstacles, obstructions, or unevenness of ground-surface without affecting the effective usefulness of the other disks in the series.

The disks $e^3$ may be concavo-convex, as shown in Figs. 5, 8, 9, and 11, or be constructed flat or perforated, as may be desired.

As it may be desirable to quickly and readily change the incline of the disks at the will of the operator, I provide the beam $d'$, through which the standard $e$ operates loosely, with means for adjusting them in their line of travel, either independently or in gangs.

As seen in Figs. 8 and 11, a single hand-lever, H, carries a toothed segment, $h$, is pivoted or fulcrumed to the frame, and is provided above and below the pivotal point $h^3$ with lever-arms $h'$, which connect with the bars $d'$, through which the standards $e$ operate loosely, as shown in Fig. 8; or said lever-arms $h'$ may connect with sliding loop or bracket $d$, which is rigidly attached to bar $d'$. As the lever is operated in either direction, moving the bar $d'$ and the forward end of the disk-arms $e^2$ and upper arm, $e'$, the incline of the harrow-disks is made to diverge from or approach to the approximate line of travel. This construction being understood to be an important feature of this invention, it will be observed that the inner backward peripheries of the inner disks would come into such juxtaposition relative to each other as to form a ridge of soil longitudinal with the line of travel, and to obviate this, or to properly regulate the respective or relative position of the disks, I employ the adjusting means $e^4$ $e^5$ $e^6$, whereby the disks are firmly secured in any desired position, while generally permitting the lateral adjustment or incline of the disks to be regulated by the lateral movement of the bar $d'$ by lever H and link $h'$, or their equivalents. For this purpose arms $e^6$ may be secured to and revolve or move with bar D, said arms extending backward to receive rod $e^4$, which passes through arm $e'$ approximately over the center of disk $e^3$, and as this arm $e'$ is rigidly attached to standard $e$, and as standard $e$ is firmly attached to supporting disk-arms $e^2$, only permitting the approximate vertical movement of said arms, it will be seen that any lateral movement of the rear end of arm $e'$ will cause the standard $e$ to turn in its bearing in bar $d'$, and thereby cause the disk $e^3$, with its supporting-arms $e^2$, to move correspondingly, or that any lateral adjustment of the rear ends of arms $e'$, by means of rod $e^4$ and nuts $e^5$ and arms $e^6$, or their equivalents, will regulate the position of the disks in like manner; but one essential reason for and object in securing and regulating the disks $e^3$ by arms $e'$, and rod $e^4$, and nuts $e^5$, and placing the same approximately over the turning center of disks $e^3$, is to permit and make practical the general working adjustment of the disks by the lever's movements, as shown in Figs. 5, 8, and 11.

When it is necessary to elevate the gangs or series of disks separately, I employ a separate independent hand-lever, $i$, which is so connected to the frame D $d$ $d'$, or to the bar D, which supports the bar $d'$ and the disks, as to throw the parts $e$ $e'$ $e^2$, carrying the disks, upward at the will of the operator to obviate obstructions and to force the disks out of operation.

It is obvious that the relative positions of the disks or teeth could not be changed while in action by a direct transverse movement, as their hold in the soil would preclude the possibility of such action or motion in practice, and, also, that the journals of the disks must be approximately in a vertical line with the turning axis, to allow the front portion, $e$, and bar $d'$ to be forced laterally and change the direction of the disks, as desired. To this end the frame $e$ $e'$ $e^2$ extends forward of the riding-axis, and as it is forced in either direction by means of the bar $d'$ and compound lever H $h'$, the direction of the disks is changed and held rigid transversely, while the spring mechanism allows them independently to ride over obstructions and surmount obstacles.

It will be observed that the disks, in riding over obstacles, pass backward and outward, preventing sudden jar upon the draft, and allowing them more readily and easily to accommodate themselves to the unevenness of the ground or ordinary obstructions, and to immediately return to effective operative position. In some constructions, however, the disk-arms $e^2$, being approximately horizontal, will move upward, as shown in Fig. 6.

It will be observed that the disks may be hung independently or in gangs, and be concavo-convex, toothed, or perforated, and, also, that each disk operates independently of the others in surmounting obstacles when hung separately.

This invention is designed to cover any mode of spring-action and any construction of spring, as indicated by the term "a spring or its equivalent."

In the construction shown in Fig. 1 the rod $e^4$ is secured to the beam B', as by that construction either the wheels B or the disks $e^3$ may be thrown in or out of operation at will; but in the construction where it is desired to move the disks upward by a lever and journaled bar D, the said rod $e^4$ and arms $e^6$ are secured to the bar D, so as to operate therewith, as seen in Figs. 5 and 9.

It will be observed that the construction shown, which allows the disks to ride over obstructions and immediately reassume a position for effective service, allows the disks to be formed of less metal than if the weight of the entire machine or any considerable portion thereof rested upon the separate disks, and the concussion with the obstacle would be greater, and in this sense the construction presented is cheaper in cost of manufacture, lighter in weight and draft, performs more thorough work, and is consequently a better device.

Nuts $e^5$, or other proper and convenient means, may be secured upon the rod $e^4$ to regulate the relative position of the disks, and said disks may be arranged with one or more in each of the holding-frames $e^2$, if desired.

I have generally herein designated the parts $e^3$ as "disks;" but it will be understood that teeth, fingers, or knives, as shown in Figs. 2 and 9, may be employed with equal success in relation to the other parts.

Various modifications may be employed in the details of construction without departing from the principle of my invention or sacrificing the advantages thereof, the essential features of which are the revolving harrow disks or teeth, arranged independently or in pairs and held in contact with the soil by a spring, springs, or other equivalent device, and capable of independent vertical play and compound lateral adjustment at will, as shown.

I do not confine myself to any form of spring, either single or compound, spiral or torsion, nor to any particular form of harrow-disks, nor to any arbitrary construction of parts, as equivalents may be used without departing from the invention.

Revolving disks arranged in gangs have been used in connection with springs, but not for the purpose of having each disk in either gang ride over obstructions without disturbing the other disks in the same gang; and disks and teeth have been adjusted in relation to the line of travel, but not independently, not without disturbing their relative vertical position or positions relatively to the plane of the axle.

Having thus fully described my invention, what I claim, and desire to secure by Letters Patent of the United States, is—

1. In a harrow or cultivator, a series of revolving disks having independent action, combined with independent springs and arranged substantially as described, whereby each disk shall be held in constant contact and service with the soil except when one or more of the disks come in contact with obstructions and only the overriding disks are disturbed, as specified.

2. In a harrow or cultivator, the revolving disks or teeth hung independently to give independent action to each, and held in contact with the soil by a spring or springs, the said disks or teeth being adapted to be adjusted in the frames to any desired incline, as specified, for the purposes set forth.

3. In a harrow or cultivator, the teeth or revolving disks arranged in pairs or independently, and held in contact with the soil by a spring or springs, and hung or journaled in frames, said frames being adapted to be readily adjusted in relation to the line of travel at will, as specified.

4. In a harrow or cultivator, the teeth or revolving disks held in contact with the soil by a spring or springs, hung in frames and capable of adjustment therein, combined with such frames and springs and with means for adjusting the frames at any desired incline in relation to the line of travel, as specified.

5. In a harrow or cultivator, the teeth or revolving disks arranged in gangs of two or independently, held in contact with the soil by springs, and hung in frames held rigid in lateral position, combined with said frames, the main frame, and with means for giving comparatively permanent or ready adjustment at will without affecting the vertical position of the teeth or disks, as specified.

6. In a harrow or cultivator, the teeth or revolving disks pivoted or journaled in backwardly-inclined carrying-frames, and capable of adjustment therein, the said frames having vertical and backward independent play and being capable of oscillatory adjustment, as and for the purposes set forth.

7. In a harrow or cultivator, the independent gangs of revolving disks or teeth, the frames $e$ $e'$ $e^2$, and springs, combined with the lever H $h^3$, links $h'$, and toothed segment $h$, and adjusting means $e^5$, as and for the purposes specified.

8. In a harrow or cultivator, the teeth or revolving disks pivoted in carrying-frames hung upon an inclined shaft, and being susceptible of vertical, oscillatory, and lateral movement, combined with a spring or springs, as and for the purposes specified.

9. In a harrow or cultivator, a tooth or revolving disk, combined with an inclined pivot and a spring or springs, as specified.

10. In a harrow or cultivator, a tooth or revolving disk hung upon an incline, and adapted to have a combined backward vertical and lateral movement, as shown in Fig. $10^a$, and herein specified.

11. In a sulky harrow or cultivator, the combination of the revolving disks or teeth, the springs, and means for adjusting the incline of the disks or teeth, with means for throwing either the disks or riding-wheels in or out of operation at will, the spring-action serving, when the disks are in operation, to cushion the concussions in overriding obstructions, and in similar manner when coming in contact with protruding obstructions when the riding-wheels are in operation and the disks elevated, as specified.

12. In a sulky harrow or cultivator, the combination of the frame and riding-wheels with the disks or teeth, the springs and proper connections, and with a lever or levers, by which the duplex crank axle is turned in sections, as and for the purposes set forth.

13. The frame $e\ e'\ e^2$, the springs, and the disks or teeth $e^3$, combined with the journaled bars D and an operating-lever, as specified.

14. In a harrow or cultivator, the revolving disks or teeth having forward spring connections, combined with the journaled bars D or their equivalents, and with means for operating the same, as set forth, for the purposes specified.

15. The compound lever H $h'\ h'$ and ratcheted segment $h$, combined with gangs of harrowing disks or teeth, and with holding means, as set forth.

16. The combination of the frame $e\ e'\ e^2$ and rod $e^4$, or its equivalent, with the disks or teeth $e^3$ and a main frame, as and for the purposes set forth.

17. The combination of the springs $f f'$ and bolt $f^2$ with the nuts $f^3$ and disks or teeth, as and for the purposes set forth.

18. The combination of the rod $e^4$ and adjusting means $e^5$ with the disks or teeth $e^3$ and the frames $e^6$, as and for the purposes set forth.

19. In a harrow or cultivator, the revolving disks or teeth hung independently, arranged in the same plane as and under the axle, and held in constant contact with the soil by springs, whereby the machine becomes more efficient in service and is enabled to turn upon a common center without wrenching the disk or tooth bearings or supports when the disks or teeth are in the soil, as set forth.

20. In a sulky harrow or cultivator, the independent disks or teeth arranged in a plane with the axle held in contact with the soil by springs, and hung on inclined axles, whereby the side pressure due from turning on a common center in one direction will elevate the disks, and in the opposite direction the convex or inclined sides of the disks or teeth will serve a similar purpose, to prevent wrenching the disks or bearings, as specified.

21. In a harrow or cultivator, two or more independent gangs of inclined teeth, combined with independent springs, and with means, as $e^5$, Figs. 5 and 9, for adjusting said teeth independently or in gangs of two, as specified.

In testimony whereof I affix my signature in presence of two witnesses.

THOMAS E. JEFFERSON.

Witnesses:
H. CLAY SMITH,
W. L. ARGUE.